United States Patent

Lee et al.

(10) Patent No.: US 9,920,731 B2
(45) Date of Patent: Mar. 20, 2018

(54) METHOD AND APPARATUS FOR RESTART WHEN SSC IS RELEASED

(71) Applicant: Hyundai Motor Company, Seoul (KR)

(72) Inventors: Hyung-Ju Lee, Yongin-si (KR); Kyu-Jin Jo, Suwon-si (KR); Jae-Woong Yoo, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 202 days.

(21) Appl. No.: 14/956,045

(22) Filed: Dec. 1, 2015

(65) Prior Publication Data

US 2016/0327005 A1   Nov. 10, 2016

(30) Foreign Application Priority Data

May 8, 2015   (KR) .................. 10-2015-0064530

(51) Int. Cl.
*F02N 11/08* (2006.01)
*B60W 30/18* (2012.01)
*F02N 5/04* (2006.01)

(52) U.S. Cl.
CPC ... *F02N 11/0803* (2013.01); *B60W 30/18072* (2013.01); *F02N 11/0814* (2013.01); *F02N 5/04* (2013.01); *F02N 2200/101* (2013.01); *F02N 2300/2002* (2013.01); *Y02T 10/48* (2013.01)

(58) Field of Classification Search
CPC ............... F02D 41/123; F02N 11/0803; F02N 11/0814; F02N 2300/2002; F02N 5/04; F02N 2200/101; B60W 30/18072; Y02T 10/48

See application file for complete search history.

(56) References Cited

U.S. PATENT DOCUMENTS

| | | | |
|---|---|---|---|
| 7,589,413 B2 | 9/2009 | Otremba et al. | |
| 8,188,587 B2 | 5/2012 | Jereza | |
| 8,655,562 B2 | 2/2014 | Juhlin-Dannfelt et al. | |
| 9,267,457 B2 * | 2/2016 | Lewis | F02N 5/04 |
| 2011/0118915 A1 | 5/2011 | Ortmann et al. | |
| 2013/0131948 A1 | 5/2013 | Iwao et al. | |

FOREIGN PATENT DOCUMENTS

| | | |
|---|---|---|
| JP | 2012-172578 | 9/2012 |
| JP | 2013-95247 | 5/2013 |
| JP | 5236044 B2 | 7/2013 |
| JP | 2014-185595 A | 10/2014 |
| JP | 5633557 B2 | 12/2014 |
| KR | 10-0870385 B1 | 11/2008 |
| KR | 10-2012-0056785 A | 6/2012 |

* cited by examiner

*Primary Examiner* — Hung Q Nguyen
*Assistant Examiner* — Xiao Mo
(74) *Attorney, Agent, or Firm* — Brinks Gilson & Lione

(57) ABSTRACT

A method for restart when Start-Stop Coasting (SSC) is released may include: determining whether a traveling vehicle satisfies a condition for releasing SSC after entry into SSC (S100); determining whether emergency startup of the vehicle is required (S200) when the traveling vehicle satisfies the condition for releasing SSC after entry into SSC; and performing a first startup process (S300) in which a clutch (420) is engaged along with an operation of a starter motor (430) when the emergency startup of the vehicle is required.

5 Claims, 7 Drawing Sheets

METHOD AND APPARATUS FOR RESTART WHEN SSC IS RELEASED

CROSS-REFERENCE TO RELATED APPLICATIONS

This application claims priority to and the benefit of Korean Patent Application No. 10-2015-0064530, filed on May 8, 2015, which is incorporated herein by reference in its entirety.

FIELD

The present disclosure relates to a method and apparatus for restart when SSC is released.

BACKGROUND

The statements in this section merely provide background information related to the present disclosure and may not constitute prior art.

As the dissatisfaction of consumers is recently increased due to a difference between certified fuel efficiency and actual fuel efficiency when traveling on the road, an improvement of the actual fuel efficiency is increasingly important. Accordingly, technology for improving actual fuel efficiency when traveling on the road by using driving condition of a driver, surrounding traffic, road information, etc., as well as technology for controlling vehicle systems, has been researched and developed in vehicle industry.

We have discovered that a technique of searching and guiding an economic driving route using IT and traffic information, a technique of guiding driving at high fuel efficiency by memorizing road gradient information and previous traveling patterns, a technique of controlling charge/discharge of a battery according to the SOC (state of charge) level thereof by predicting and determining road gradient and traffic information, and a technique of selectively controlling a traveling mode such that fuel consumption is reduced based on a destination route and traffic information by means of map information DB, are areas to be developed.

One technique for improving the fuel efficiency is an SSC (Start-Stop Coasting) technique. FIGS. 1A and 1B are diagrams for explaining SSC. Referring to FIGS. 1A and 1B, SSC is a technique of cutting off fuel supply to an engine (fuel cut) and cutting off power transfer to a transmission (clutch off) during coasting (see FIG. 1A). We have discovered that the mileage of a vehicle to which the SSC is applied is increased compared to that of the conventional vehicle since engine drag torque is cut off (see FIG. 1B).

In the SSC of the related art, the engine is started by one selected from among a clutch and a starter motor when restart is performed after the SSC is released. When the stopped engine is started by the clutch, we have discovered that an impact is generated due to the rotating clutch coupled to the engine. For this reason, since unnecessary noise and vibration are caused during the restart in the related art, drivability and durability of relevant parts may be deteriorated.

SUMMARY

The present disclosure provides a method and apparatus for restart when SSC is released, capable of rotating an engine by driving a starter motor for a short time before engagement of a clutch.

The present disclosure can be understood by the following description, and become apparent with reference to the embodiments of the present disclosure.

In accordance with the present disclosure, a method for restart when SSC is released includes: determining whether a traveling vehicle satisfies a condition for releasing SSC after entry into SSC (S100); determining whether emergency startup of the vehicle is required (S200) when the traveling vehicle satisfies the condition for releasing SSC after entry into SSC; and performing a first startup process (S300) in which a clutch (420) is engaged along with an operation of a starter motor (430) when the emergency startup of the vehicle is required.

The method may further include performing a second startup process (S400) in which the clutch (420) is engaged without the operation of the starter motor (430) when the emergency startup of the vehicle is not required.

The determining whether emergency startup of the vehicle is required (S200) may include detecting an accelerator opening degree (S210).

The determining whether emergency startup of the vehicle is required (S200) may include determining whether the detected accelerator opening degree is equal to or greater than a predetermined accelerator opening degree (S220).

The performing a first startup process (S300) may include performing a starter motor startup process (S310) of operating the starter motor (430) to rotate a stopped engine (410) after entry into SSC.

The performing a first startup process (S300) may include performing a clutch engagement process (S320) of operating the clutch (420) to couple the engine (410) and a transmission (T), which are decoupled from each other, after entry into SSC.

In the performing a first startup process (S300), the performing a starter motor startup process (S310) and the performing a clutch engagement process (S320) may be simultaneously carried out.

In the performing a first startup process (S300), the performing a starter motor startup process (S310) and the performing a clutch engagement process (S320) may be sequentially carried out.

In the performing a starter motor startup process (S310), the starter motor (430) may be operated for a predetermined time.

In the performing a starter motor startup process (S310), the starter motor (430) may be operated until the rotational speed of the engine (410) is a predetermined rotational speed.

The predetermined rotational speed may be a rotational speed in a predetermined error range relative to the rotational speed of the transmission (T).

In the performing a starter motor startup process (S310), fuel may be injected into the engine (410).

After the performing a starter motor startup process (S310) is completed, fuel may be injected into the engine (410).

In accordance with another aspect of the present disclosure, there is provided a storage medium storing the method for restart when SSC is released.

In accordance with another aspect of the present disclosure, an apparatus for restart when SSC is released includes a storage medium (100), a detection unit (200) detecting an accelerator opening degree, a transmission rotational speed, and an engine rotational speed, and a control unit (300) determining whether emergency startup of a vehicle is required according to information detected by the detection unit (200) so as to control a unit to be controlled (400).

The detection unit (200) may include an accelerator opening degree detection unit (210), a transmission rotational speed detection unit (220), and an engine rotational speed detection unit (230).

The unit to be controlled (400) may include an engine (410) into which fuel is injected, a clutch (420) coupling or decoupling the engine (410) and a transmission (T), and a starter motor (430) rotating the engine (410).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
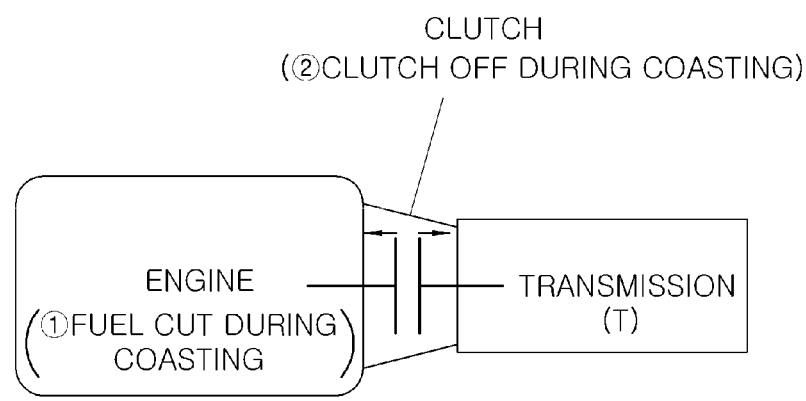
FIGS. 1A and 1B are diagrams for explaining SSC.
Figure 1B:
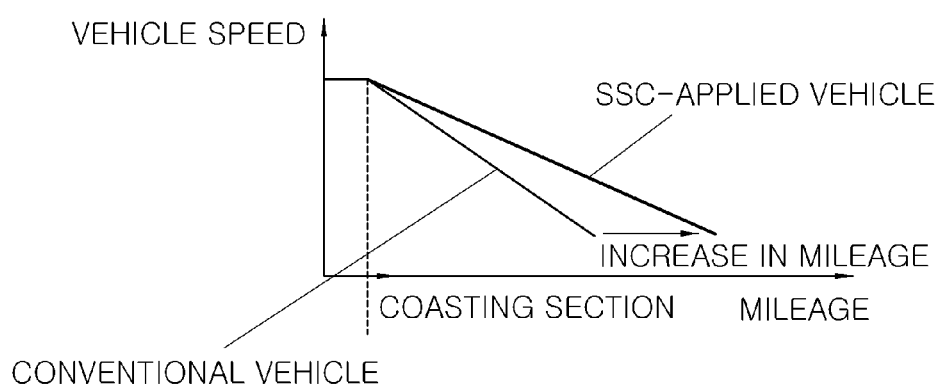
Figure 2:
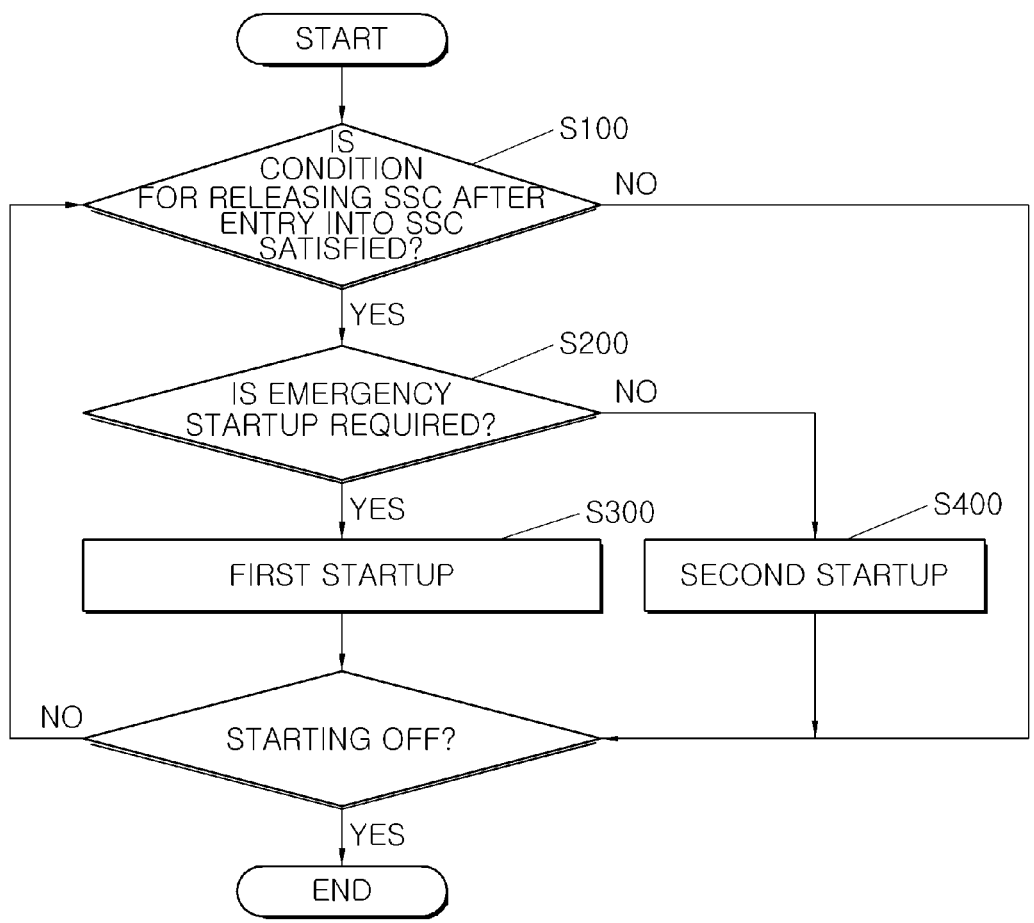
FIGS. 2 to 5 are flowcharts illustrating a method for restart when SSC is released.
Figure 3:
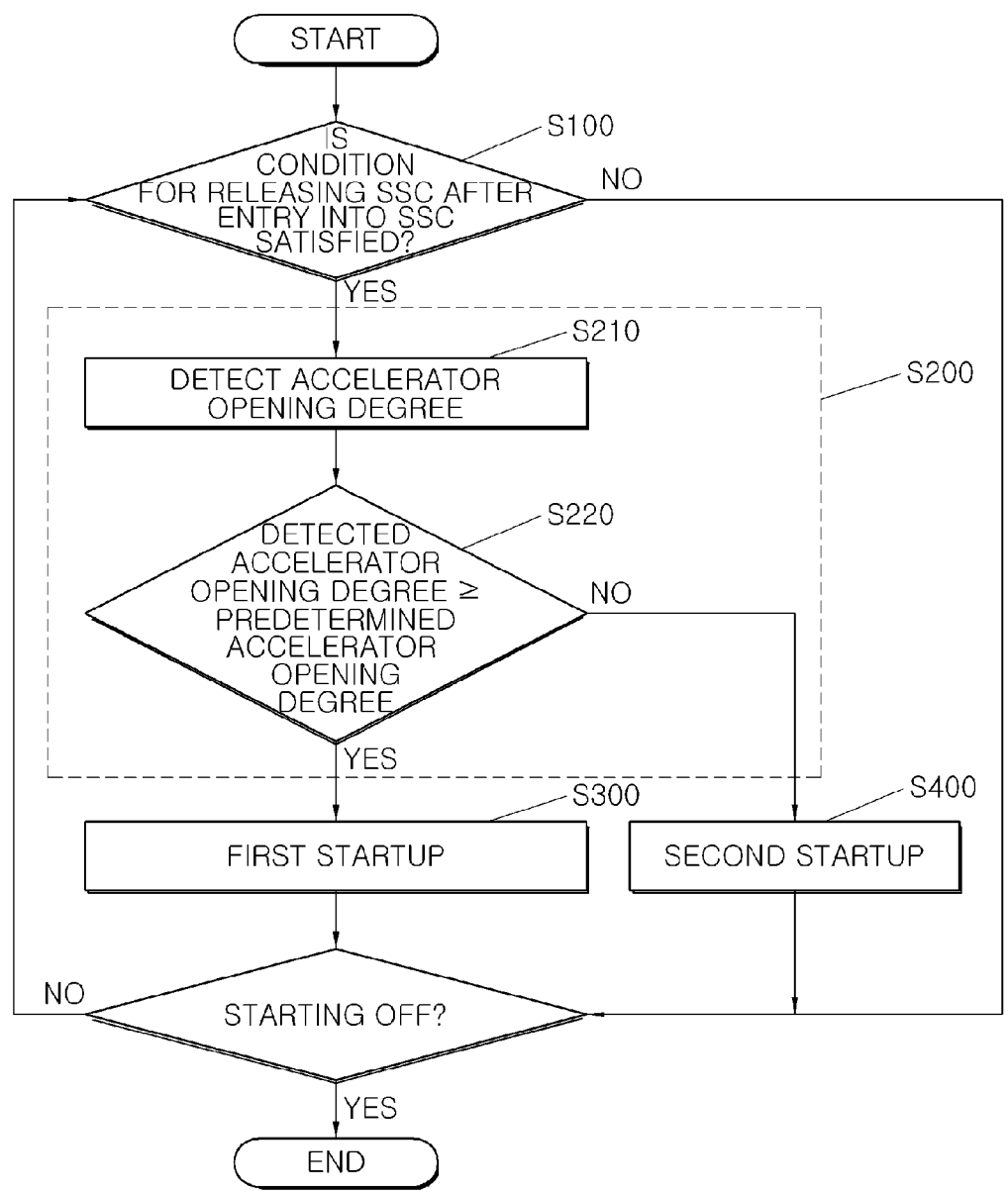
Figure 4:
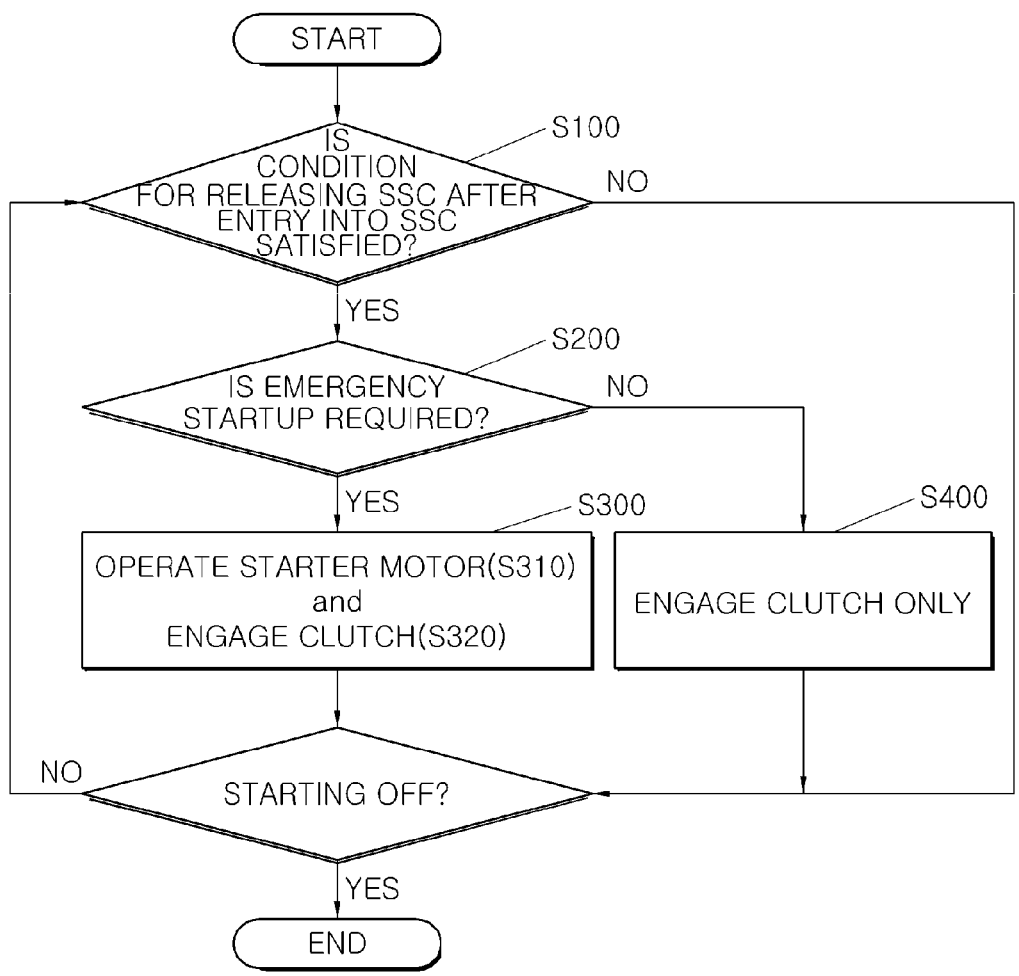
Figure 5:
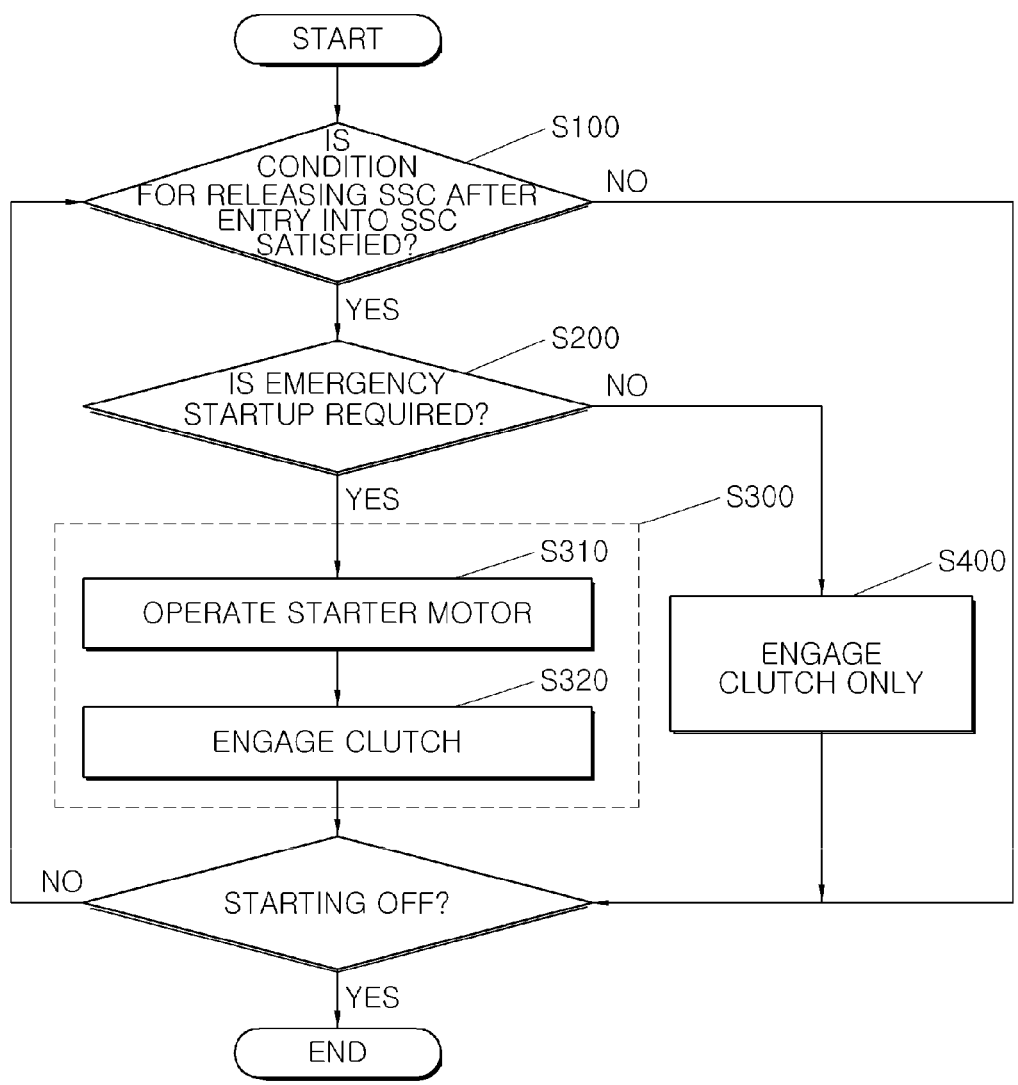

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

On the basis of the principle that the inventor can define the appropriate concept of a term in order to describe his/her own present disclosure in the best way, it should be construed as meaning and concepts for complying with the technical idea of the present disclosure. Accordingly, the embodiments described in the present specification and the construction shown in the drawings are nothing but one form of the present disclosure, and it does not cover all the technical ideas of the present disclosure. Thus, it should be understood that various changes and modifications may be made at the time of filing the present application. In addition, detailed descriptions of functions and constructions well known in the art may be omitted to avoid unnecessarily obscuring the gist of the present disclosure.

Referring to FIGS. 2 to 5, the method for restart when SSC is released according to the embodiment of the present disclosure includes a step S100 of determining whether a traveling vehicle satisfies a condition for releasing SSC after entry into SSC, a step S200 of determining whether emergency startup of the vehicle is required when the traveling vehicle satisfies the condition for releasing SSC after entry into SSC, and a step S300 of performing a first startup process in which a clutch 420 is engaged along with an operation of a starter motor 430 when the emergency startup of the vehicle is required. In addition, the method for restart when SSC is released further includes a step S400 of performing a second startup process in which the clutch 420 is engaged without the operation of the starter motor 430 when the emergency startup of the vehicle is not required.

In the step S100 of determining whether a traveling vehicle satisfies a condition for releasing SSC after entry into SSC, the condition of entry into SSC and the condition for releasing SSC may be differently set according to the type of vehicle. For example, the condition of entry into SSC may be a condition in which an accelerator pedal and a brake pedal are not operated and a vehicle speed is equal to or greater than a predetermined speed (herein, the predetermined speed may be differently set according to the type of vehicle). In addition, when the vehicle enters the SSC, fuel supply to an engine may be cut off (fuel cut) and power transfer to a transmission may be cut off (clutch off). In addition, the condition for releasing SSC may be a condition in which the accelerator pedal or the brake pedal is operated or the vehicle speed is less than a predetermined speed (herein, the predetermined speed may be differently set according to the type of vehicle).

The step S200 of determining whether emergency startup of the vehicle is required includes a step S210 of detecting an accelerator opening degree (e.g. the degree of depression of the accelerator pedal), and a step S220 of determining whether the detected accelerator opening degree is equal to or greater than a predetermined accelerator opening degree. That is, when the detected accelerator opening degree is equal to or greater than the predetermined accelerator opening degree, it is determined that a driver has an intention to rapidly accelerate, and thus it is determined that the emergency startup of the vehicle is required. The predetermined accelerator opening degree may be differently set according to the type of vehicle.

The step S300 of performing a first startup process includes a step S310 of performing a starter motor startup process and a step S320 of performing a clutch engagement process. The step S310 of performing a starter motor startup process is a step of operating the starter motor 430 to rotate the stopped engine 410 after the entry into SSC. Since the clutch is decoupled (clutch off) and the fuel supply to the engine is cut off (fuel cut) after the entry into SSC, the engine is stopped. Accordingly, since the engine 410 is rotated by the starter motor 430 before the engagement of the clutch in the step S310 of performing a starter motor startup process, an impact due to the engagement of the clutch is reduced.

The step S320 of performing a clutch engagement process is a step of operating the clutch 420 to couple the engine 410 and a transmission T which are decoupled from each other after the entry into SSC. In the step S320 of performing a clutch engagement process, the engine 410 is rotated by the starter motor 430. In addition, since the clutch 420 is decoupled after the entry into SSC and the vehicle is coasted, wheels of the vehicle and the transmission T connected to the wheels are also rotated. Accordingly, since the rotational speed of the engine 410 is nearly similar to the rotational speed of the transmission T in the present disclosure, compared to the related art in which the engine 410 is stopped during the engagement of the clutch, the impact due to the engagement of the clutch is reduced.

In the step S300 of performing a first startup process, the step S310 of performing a starter motor startup process and the step S320 of performing a clutch engagement process may be simultaneously or sequentially carried out. When the step S310 of performing a starter motor startup process and the step S320 of performing a clutch engagement process are simultaneously carried out, the restart may more rapidly performed corresponding to the need of the emergency startup. In addition, when the step S310 of performing a starter motor startup process and the step S320 of performing a clutch engagement process are sequentially carried out, the impact due to the engagement of the clutch may be further reduced since the clutch is engaged after the rotational speed of the engine is fully secured.

In the step S310 of performing a starter motor startup process, the starter motor 430 may be operated for a predetermined time. That is, the durability of the starter motor 430 may be secured by minimizing the operation time of the relatively expensive starter motor 430. The predetermined time may be differently set according to the type of starter motor or the type of vehicle.

In the step S310 of performing a starter motor startup process, the starter motor 430 may be operated until the rotational speed of the engine 410 is a predetermined rotational speed. The predetermined rotational speed may be differently set according to the type of vehicle. In addition, the predetermined rotational speed may be set to be a rotational speed in a predetermined error range relative to the rotational speed of the transmission T. That is, the starter motor 430 may be operated until the predetermined rotational speed is in an error range in which the upper limit or the lower limit is a predetermined (+) error or a predetermined (−) error of the rotational speed of the transmission T. Thus, since the starter motor is operated when the rotational speed of the engine is nearly similar to the rotational speed of the transmission, the clutch is engaged after the rotational speed of the engine is fully secured. Consequently, the impact due to the engagement of the clutch may be further reduced.

In the method for restart when SSC is released, the fuel may be injected into the engine 410 in the step S310 of performing a starter motor startup process, and the fuel may also be injected into the engine 410 after the step S310 of performing a starter motor startup process is completed. That is, the fuel may be injected into the engine when the vehicle travels at high fuel efficiency according to the traveling state thereof.

Figure 6:
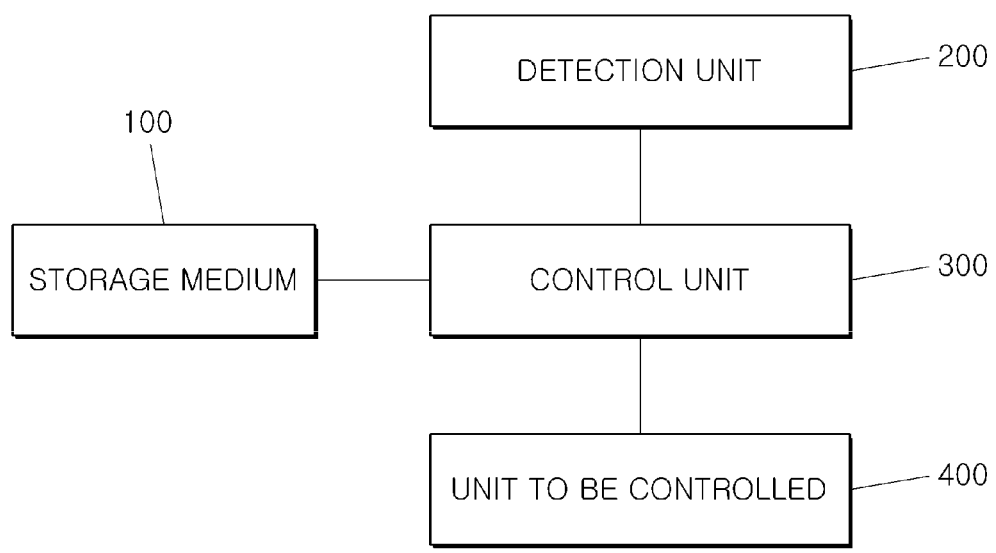
FIGS. 6 and 7 are block diagrams illustrating an apparatus for restart when SSC is released.
Figure 7:
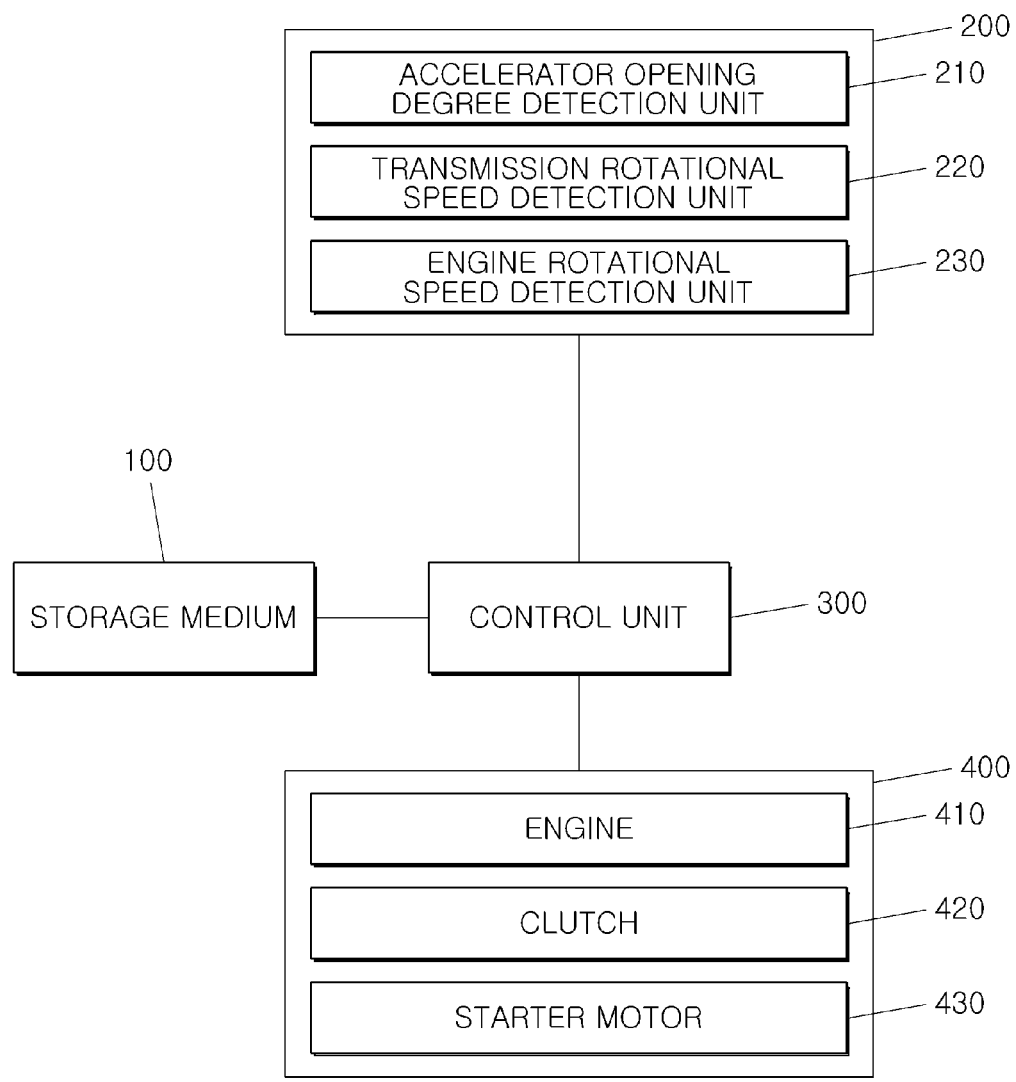

FIGS. 6 and 7 are block diagrams illustrating an apparatus for restart when SSC is released according to another embodiment of the present disclosure. Referring to FIGS. 6 and 7, the apparatus for restart when SSC is released includes a storage medium 100, a detection unit 200, a control unit 300, and a unit to be controlled 400.

The detection unit 200 includes an accelerator opening degree detection unit 210, a transmission rotational speed detection unit 220 (e.g. detecting the speed of the transmission output shaft or an intermediary shaft), and an engine rotational speed detection unit 230, and detects an accelerator opening degree, a transmission rotational speed, and an engine rotational speed.

The control unit 300 determines whether emergency startup of a vehicle is required according to information detected by the detection unit 200, and then controls the unit to be controlled 400.

The unit to be controlled 400 includes an engine 410 into which fuel is injected, a clutch 420 which couples or decouples the engine 410 and a transmission T, and a starter motor 430 which rotates the engine 410.

In accordance with the present disclosure, it is possible to reduce an impact due to engagement of a clutch when restart is performed after release of SSC and thus to improve durability of relevant parts such as the clutch.

While the present disclosure has been described with respect to the specific embodiments, it will be apparent to those skilled in the art that various changes and modifications may be made without departing from the spirit and scope of the present disclosure as defined in the following claims.

What is claimed is:

1. A method for restart when Start-Stop Coasting (SSC) is released, the method comprising:
   determining whether a traveling vehicle satisfies a condition for releasing SSC after entry into SSC;
   determining whether an emergency startup of the traveling vehicle is required when the traveling vehicle satisfies the condition for releasing SSC after the entry into SSC; and
   performing a first startup process in which a clutch is engaged along with an operation of a starter motor when the emergency startup of the traveling vehicle is required; and
   performing a second startup process in which the clutch is engaged without the operation of the starter motor when the emergency startup of the traveling vehicle is not required,
   wherein the performing a first startup process comprises performing a starter motor startup process of operating the starter motor to rotate an engine after entry into SSC, and performing a clutch engagement process of operating the clutch to couple the engine and a transmission, which are decoupled from each other, after entry into SSC,
   wherein in the performing a first startup process, the performing a starter motor startup process and the performing a clutch engagement process are sequentially carried out,
   wherein, in the performing a starter motor startup process, the starter motor is operated until a rotational speed of the engine is a predetermined rotational speed, which is a rotational speed in a predetermined error range relative to a rotational speed of a transmission.

2. The method of claim 1, wherein the determining whether the emergency startup of the traveling vehicle is required comprises detecting an accelerator opening degree.

3. The method of claim 2, wherein the determining whether the emergency startup of the traveling vehicle is required comprises determining whether the detected accelerator opening degree is equal to or greater than a predetermined accelerator opening degree.

4. The method of claim 1, wherein, in the performing a starter motor startup process, fuel is injected into the engine.

5. The method of claim 1, wherein, after the performing a starter motor startup process is completed, fuel is injected into the engine.

* * * * *